United States Patent Office 3,296,262
Patented Jan. 3, 1967

3,296,262
PURIFICATION OF CYANURIC ACID
Herbert F. Scott, Jr., Prince George, Va., assignor to Allied Chemical Corporation, New York, N.Y., a corporation of New York
No Drawing. Filed Mar. 8, 1965, Ser. No. 438,125
8 Claims. (Cl. 260—248)

This invention relates to the purification of crude cyanuric acid, particularly that which is accompanied by ammelide.

Crude cyanuric acid may be produced by heating urea, biuret or urea cyanurate at about 200° to 350° C. until the evolution of ammonia substantially ceases. The crude product thus produced is largely composed of cyanuric acid, but contains a significant amount of ammelide as well as other impurities. The crude cyanuric acid may be purified by hydrolysis of the amino substituted triazine impurities in aqueous mineral acids as described in the literature. These processes employ various concentrations of strong mineral acids in amounts at least stoichiometric to impurities in the crude cyanuric acid. Pure crystals of cyanuric acid may then be separated from the solution of acidic digestion chemicals. Recently it has been pointed out in U.S. Patent 3,107,244 that unless careful control of pH and temperature conditions are maintained, this separation step is accompanied by the formation of a hard, compact mass of cyanuric acid dihydrate, which holds up impurities, plugs equipment and is difficult and expensive to disperse and remove. According to the patent, dihydrate formation may be avoided by carrying out the purification procedure under conditions such that the temperature of the cyanuric acid crystals is above about 57° C. whenever the acid concentration of liquid in contact with the crystals is below 2 normal. While this process effectively overcomes the dihydrate problem, it reduces the amount of cyanuric acid which can be recovered, since the elevated temperatures, particularly in the washing step, cause significant amounts of the cyanuric acid to be dissolved.

It is, therefore, an object of the present invention to devise a process for the purification of crude cyanuric acid which permits recovery of purified cyanuric acid from its digestion liquor without the formation of cyanuric acid dihydrate and without a sacrifice in yield.

This and other objects which will be apparent hereinafter are achieved by a process which comprises digesting crude cyanuric acid in aqueous nitric acid, separating cyanuric acid crystals from the digestion liquor and washing the cyanuric acid crystals with water at a temperature sufficient to maintain them at about 20° to 50° C. preferably about 35° to 40° C. while reducing the acid concentration of the liquid in contact with the crystals to below about 1 N, preferably no higher than 0.8 N, but no lower than 0.3 N, preferably no lower than 0.4 N, depending on the temperature used, the minimum acid concentration increasing in the range 0.3 N to about 0.7 N as the temperature decreases in the range 50° to 20° C.

It has been discovered that when nitric acid is used for the digestion, and, hence, is the acid medium in contact with the cyanuric acid crystals separated from the digestion liquor, these crystals can be maintained at a surprisingly low temperature without dihydrate forming, while the wash water removes the acid medium from the crystals and decreases the acid concentration of the surrounding liquor. More particularly, it has been discovered that temperatures as low as about 20° C. may be maintained while the nitric acid concentration is reduced to slightly above 0.7 N, and that temperatures as low as 35° C. may be maintained while reducing the nitric acid concentration to as low as 0.5 N.

The temperatures at which the dihydrate forms when hydrochloric acid or sulfuric acid are used are considerably higher than with nitric acid at the same acid concentration.

In a preferred mode of carrying out the present invention, crude cyanuric acid, generally that containing ammelide and produced by pyrolizing urea and/or urea cyanurate at temperatures of about 200 to 350° C. under pressures not substantially in excess of atmospheric, is cooled and pulverized. The crude cyanuric acid is sent to a cyanuric acid digester. This digester also receives concentrated (usually about 5 to 12 N) nitric acid and recycled acidic mother liquor. Nitric acid concentration in the digester should be sufficient to hydrolyze all of the ammelide, and is preferably about 2 to 4 N (i.e. 2 to 4 molar). The resulting mixture is heated, preferably to its boiling point, e.g. by indirect steam, until the ammelide is hydrolyzed. The use of temperatures as much as, say, 10° C. below the boiling point is possible but impractical. The digestion may be carried out at atmospheric or superatmospheric pressure.

It is not necessary that all the cyanuric acid be dissolved during the digestion. Rather, it has been found that a considerable economic advantage can be gained with no sacrifice in purity of the final product by feeding sufficient cyanuric acid to the digester to result in a slurry during the digestion.

Digester effluent is fed into a cooler where any dissolved cyanuric acid is precipitated. Temperature of the slurry after cooling is about 25°–50° C. preferably about 35° to 40° C. and nitric acid normality of the acid solution is usually about 2.5 to 4.5 N. Control of said normality in the cooler may be achieved by controlling the ratio of nitric acid to crude cyanuric acid fed to the digester. That is, if normality of the acid is too low in the cooler, the nitric acid fed to the digester may be increased until sufficient acid is being added to give the desired normality in the cooler. The consumption of acid in the digester will depend to a large extent on the amount of ammelide in the crude cyanuric acid.

A continuous stream of cyanuric acid slurry is withdrawn from the cooler and fed to a suitable device, usually a centrifuge, for separating the cyanuric acid from the mother liquor. The mother liquor contains most of the dissolved impurities, ammonium nitrate, and excess nitric acid. A portion of this mother liquor is continuously purged to remove ammonium nitrate formed during the hydrolysis step, and the remainder is recycled to the digester, as mentioned above.

The wet cyanuric acid cake from the separating device, damp with liquid containing nitric acid, ammonium nitrate, and other soluble impurities is introduced into a cyanuric acid reslurry tank and reslurried with about an equal weight of water at about 20° to 50° C. The temperature of the mixture is maintained at about 25° to 45° C., preferably 35° to 40° C. Temperatures as low as 20° C. may be used in this step, but as the temperature of the cyanuric acid is decreased a higher acid concentration is required to prevent formation of dihydrate, and at temperatures in the range 20° to 25° C. it would be necessary to exercise such careful control of the acid concentration as to render the use of these temperatures impractical in a commercial operation. Furthermore, since lower acid concentrations can be safely attained at the higher temperatures more of the impurities can be removed without danger of washing away too much acid and forming dihydrate.

The reslurried cyanuric acid is then fed to a second separating device which may be the same type machine as the first centrifuge, and separated again into wet cyanuric acid cake and filtrate. The filtrate is recycled to the digester.

The wet cyanuric acid cake from the second separating device contains water, some nitric acid, and very small amounts of ammonium nitrate. This wet cake is fed to a dryer. In the dryer, the moisture and the remaining nitric acid are evaporated and removed. A wet type cyclone may be provided with the dryer for effective cyanuric acid dust recovery. The wash-out stream from the cyclone is returned to the digester. The dried cyanuric acid of 99.5% purity or higher is sent to product storage bins.

*Example 1*

This example illustrates the preferred method for producing high purity cyanuric acid (CA) from crude CA by a continuous process. Temperature control becomes especially important in the steps after digestion because the concentration of nitric acid diminishes as the CA slurry flows through the washing and centrifuging steps.

Crude CA, prepared from urea and containing about 20% ammelide is slurried with 3.2 normal nitric acid to 14 wt. percent solids concentration in a purification feed tank. Three streams are continuously fed into this tank to maintain these concentrations. The composition of each stream is as follows:

(1) Crude CA

| Component | Wt. percent | Parts by Weight |
|---|---|---|
| CA | 80 | 134 |
| Impurities (chiefly ammelide) | 20 | 33 |
| Total | 100 | 167 |

(2) NITRIC ACID

| Component | Wt. percent | Parts by Weight |
|---|---|---|
| $HNO_3$ | 60 | 87.5 |
| $H_2O$ | 40 | 58.5 |
| Total | 100 | 146.0 |

(3) FILTRATE RECYCLE

| Component | Wt. percent | Parts by Weight |
|---|---|---|
| $HNO_3$ | 11.6 | 103 |
| Dissolved Solids | 0.6 | 5 |
| $H_2O$ | 87.8 | 779 |
| Total | 100.0 | 887 |

The slurry in the purification feed tank is continuously pumped into a stainless steel digester which is divided into compartments each having an agitator. The slurry enters the first compartment which has a capacity of 200 gallons and operates at 100° C. and atmospheric pressure. The slurry from the first compartment overflows to a 150-gallon compartment operating at 100° C. Retention time in each compartment is about 4 hours. The slurry from the second digester compartment is fed to a flash cooler operated at 50–100 mm. absolute pressure and is cooled to about 40° C. It is then pumped to a continuous decanter type centrifuge and the wet crystalline solids are discharged to a 250-gallon tank and re-slurried with about an equal weight of wash water at about 35° C. The resulting slurry has a temperature of about 37° C., and a nitric concentration of about 0.5 N. No cyanuric acid dihydrate is formed during the washing operation and no difficulties are encountered in mixing or handling the slurry. All impurities appear to remain in solution.

The resulting slurry is pumped to a second continuous centrifuge which discharges solids containing about 8% moisture to a steam tube dryer. The cyanuric acid is dried at 120° C. The dryer discharge is screened and packaged. The CA product has the following composition:

| Component | Wt. Percent | Parts by Weight |
|---|---|---|
| CA | 99.8 | 141.8 |
| $H_2O$ | 0.1 | 0.1 |
| Impurities | 0.1 | 0.1 |
| Total | 100.0 | 142.0 |

The filtrate from the centrifuges may be recycled in the process as previously mentioned. A portion of the filtrate is purged from the system to remove ammonium nitrate.

In operation of the present process it is important to know the temperature at which cyanuric acid dihydrate is formed from cyanuric acid in aqueous nitric acid mixtures at various nitric acid concentrations. Since cyanuric acid dihydrate formation releases heat, formation temperatures at different nitric acid concentrations are easily determined by recording temperature cooling curves with a recording potentiometer. Flasks containing hot slurries of cyanuric acid in aqueous nitric acid were placed in a bath which was gradually and uniformly cooled; temperature of the acid mixture was recorded, and supernatent liquids are analyzed for nitric acid normality. Dihydrate formation was accompanied by a break in the cooling curve and also by volumetric expansion of the cyanuric acid solids. The hydrate was compact and very difficult to handle by mechanical means. Cyanuric acid dihydrate was formed at the following temperatures:

| Nitric acid normality: | Temperature, ° C. at which cyanuric acid dihydrate formed |
|---|---|
| 0.000 | 53.0 |
| 0.383 | 41.0 |
| 0.622 | 27.0 |
| 0.709 | 20.5 |
| 0.816 | −1.5 |
| 1.153 | −3.0 |
| 1.856 | −9.0 |

In the same manner a test was run to determine if impurities such as ammonium nitrate and ammelide significantly affected this relationship. Cyanuric acid containing 1% ammelide was used in the test with 0.5202 N nitric acid containing 1 part ammonium nitrate per 40 parts water. The dihydrate formed at 32° C. indicating that the impurities did not significantly influence the temperature at which cyanuric acid dihydrate formed.

This invention, particularly when implemented on a commercial scale involving thousands of pounds of material, is of considerable significance, since the lower temperatures make possible the recovery of larger amounts of cyanuric acid. For example, at 25° C., only about ¼ as much cyanuric acid dissolves in water as dissolves at 60° C., and at 40° C., only about ½ as much cyanuric acid dissolves in water as dissolves at 60° C., as illustrated in the following table:

| Temperature: | Parts CA soluble in 100 parts water |
|---|---|
| 20 | 0.28 |
| 25 | 0.30 |
| 30 | 0.39 |
| 40 | 0.60 |
| 50 | 0.90 |
| 60 | 1.24 |

I claim:
1. A process for the purification of cyanuric acid which comprises digesting crude cyanuric acid in aqueous nitric acid, separating the cyanuric acid from the digestion liquor and washing the cyanuric acid with water at a temperature sufficient to maintain the cyanuric acid at about 20° to 50° C. while reducing the nitric acid concentration of the liquid in contact with the cyanuric acid to below about 1 N, but no lower than 0.3 N.

2. A process for the purification of cyanuric acid which comprises digesting crude cyanuric acid in aqueous nitric acid, separating from the digestion liquor cyanuric acid crystals wet with liquid containing nitric acid, and washing the cyanuric acid with water at a temperature sufficient to maintain the cyanuric acid crystals at about 25° to 45° C. while reducing the nitric acid concentration of the liquid in contact with the crystals to below about 1 N, but no lower than 0.3 N.

3. A process for the purification of cyanuric acid which comprises digesting crude cyanuric acid containing ammelide in aqueous nitric acid of a concentration at least stoichiometric to the amount of ammelide, separating from the digestion liquor cyanuric acid crystals wet with liquid containing nitric acid and washing the cyanuric acid with water at a temperature sufficient to maintain the cyanuric acid crystals at about 35° to 40° C. while reducing the acid concentration of the liquid in contact with the crystals to below about 1 N, but no lower than 0.4 N.

4. The process of claim 3 wherein the digested material is cooled to about 25° to 50° C. prior to washing.

5. The process of claim 3 wherein the digestion is carried out at a temperature which is the boiling point of the digestion mixture.

6. The process of claim 3 wherein the digesting material is in the form of a slurry.

7. The process of claim 5 wherein the residual nitric acid is removed from the cyanuric acid crystals after the washing step by drying said crystals at a temperature sufficient to volatilize said nitric acid.

8. The process for purifying crude cyanuric acid containing ammelide which comprises slurrying the crude cyanuric acid with sufficient aqueous nitric acid to produce a mixture having a nitric acid concentration of about 2 to 4 N, heating the resulting mixture to boiling until the ammelide is hydrolyzed, cooling the digestion mixture to about 35° to 40° C. and separating therefrom cyanuric acid crystals wet with liquid containing nitric acid, washing the cyanuric acid with an equal weight of water at about 20° to 50° C. until the liquid in contact with the cyanuric acid has a nitric acid concentration no higher than 0.8 N, but above 0.4 N, while maintaining the temperature of the cyanuric acid crystals at 35° to 40° C., separating the cyanuric acid crystals from the wash liquor and drying said crystals at a temperature of 105 to 175° C.

References Cited by the Examiner
UNITED STATES PATENTS
3,107,244   10/1963   Robertson _____ 260—248

WALTER A. MODANCE, *Primary Examiner.*

JOHN N. FORD, *Assistant Examiner.*